(No Model.)  W. H. RANDLE.  3 Sheets—Sheet 1.
WINDMILL.
No. 431,076.   Patented July 1, 1890.
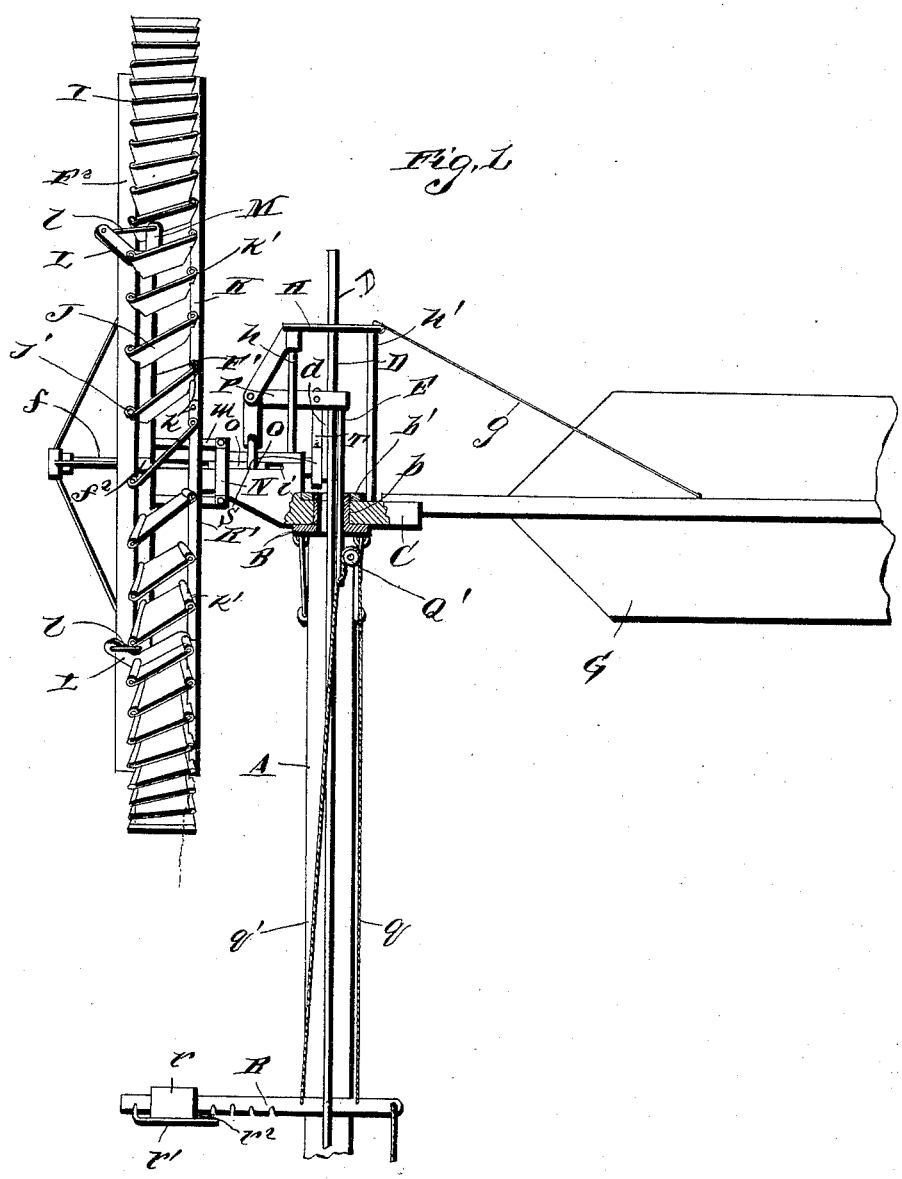

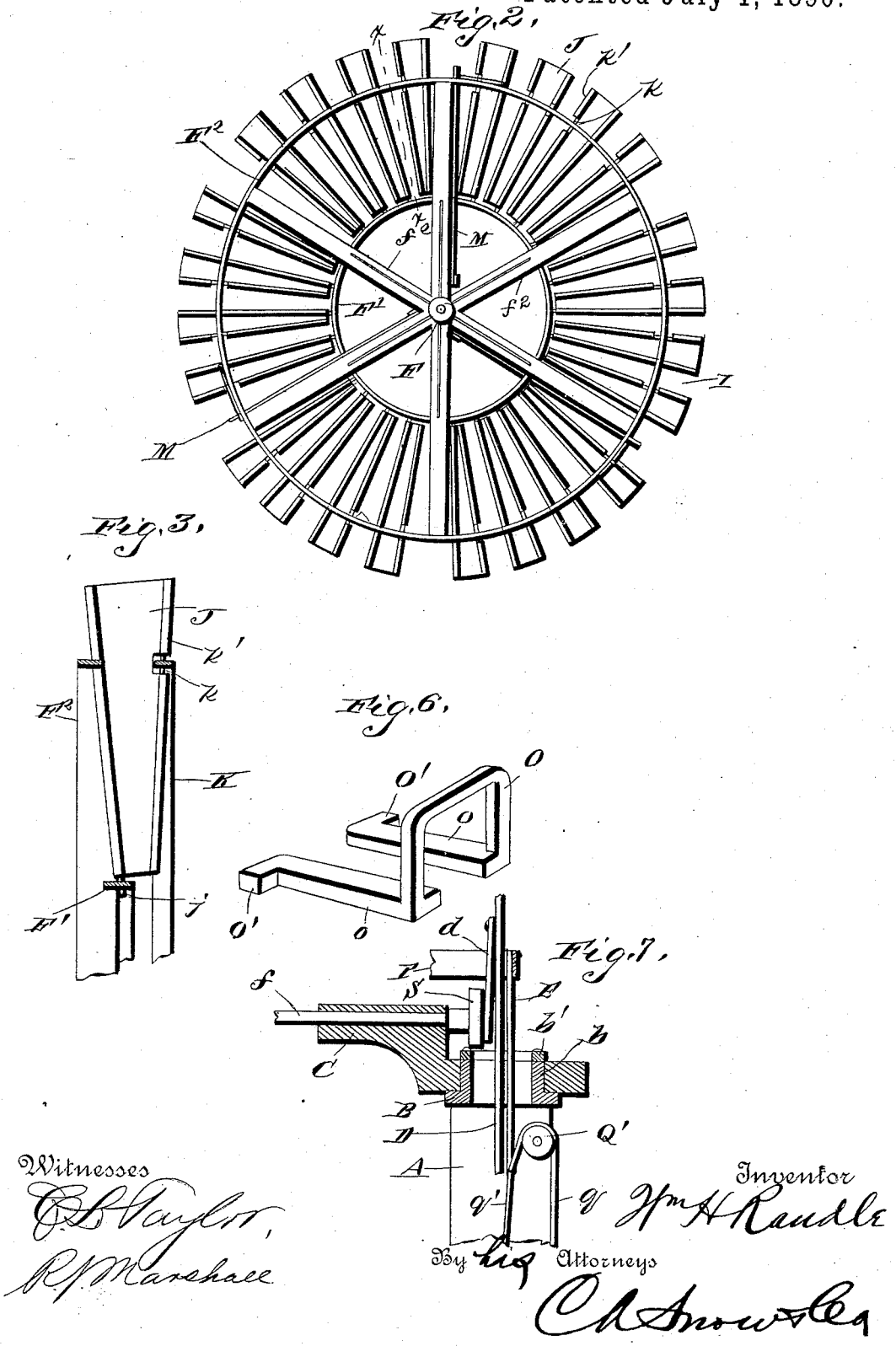

(No Model.) 3 Sheets—Sheet 3.
W. H. RANDLE.
WINDMILL.
No. 431,076. Patented July 1, 1890.
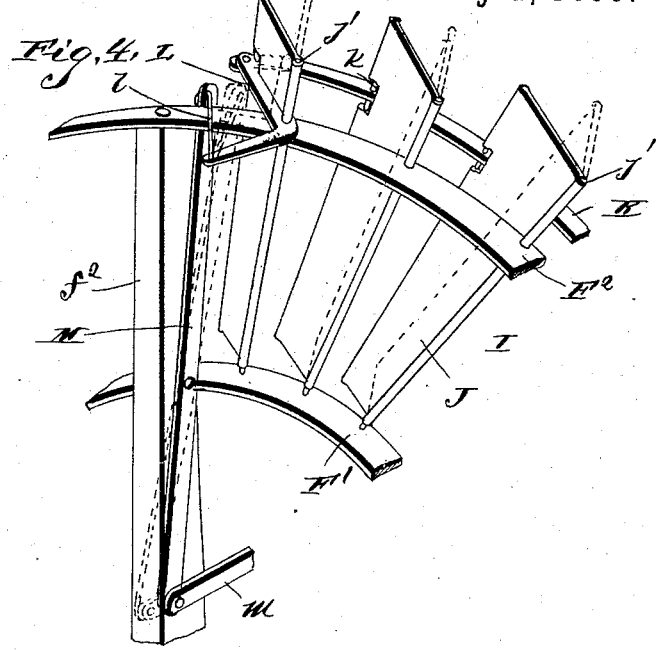
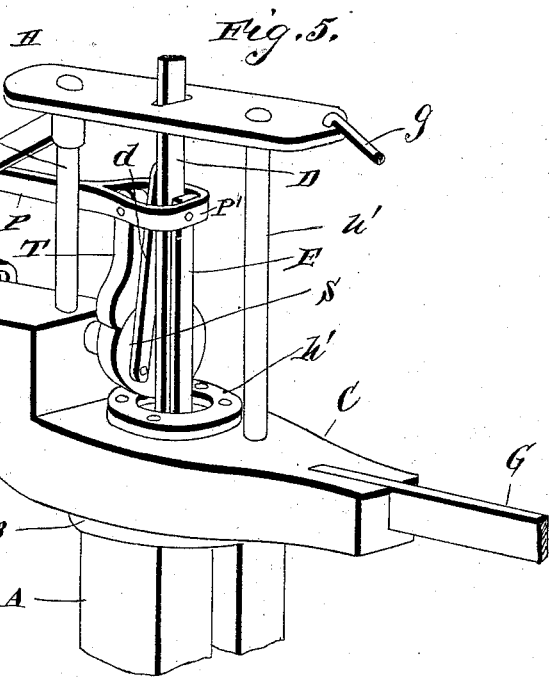
Witnesses
O. L. Taylor,
R. J. Marshall.
Inventor
Wm H Randle
By his Attorneys
C. A. Knowles

UNITED STATES PATENT OFFICE.

WILLIAM H. RANDLE, OF GLASCO, KANSAS.

WINDMILL.

SPECIFICATION forming part of Letters Patent No. 431,076, dated July 1, 1890.

Application filed September 11, 1888. Serial No. 285,111. (No model.)

*To all whom it may concern:*

Be it known that I, WILLIAM H. RANDLE, a citizen of the United States, residing at Glasco, in the county of Cloud and State of Kansas, have invented a new and useful Improvement in Windmills, of which the following is a specification.

This invention relates to windmills that revolve in a vertical plane and have feathering or adjustable slats or wings. When the windmill is out of gear, the slats or wings stand out of the wind—that is to say, they have their sides parallel with the direction of the wind, presenting only their edges to the action of the wind. The slats are brought more or less in the wind, according to the amount of work to be performed and the velocity of the wind. For the same amount of work a light wind will require more surface of slats than a high wind, and heavy work will require more surface of the slats than light work, provided the force of the wind is the same. By adjusting the slats at a greater or less angle to the direction of the wind more or less of their surface will be brought into active operation proportionate to the work to be performed and the power of the wind.

The vital point of the invention consists in the devices for adjusting the vanes to the wind and holding them in the wind at or below a certain velocity of the wind, and which will throw said vanes more or less out of the wind should the wind increase in velocity above that for which the regulating device is set.

A further object of the invention is an improved brake, which is applied to the pitman-wheel on the main shaft when the windmill is thrown out of gear to steady the windwheel and prevent it having any possible motion.

A still further object of the invention is the provision of a windmill that will be light, compact, efficient, and durable, and which will run in a light wind and automatically adapt itself to the load or amount of work and the force of the wind.

The improvement consists of the novel features and peculiar construction and combination of the parts, which will be more fully described hereinafter and claimed, and shown in the drawings, in which—

Figure 1 is a side view of a windmill of my invention. Fig. 2 is a front view of the wind-wheel. Fig. 3 is a detail section on the line $x\ x$ of Fig. 2, showing the means for operating the slats on an enlarged scale; Fig. 4, a perspective detail view of the slat-operating devices. Fig. 5 is a detail perspective view, showing the pitman-wheel, the shipper elbow-lever, and the brake. Fig. 6 is a detail view of the sliding yoke. Fig. 7 is a vertical longitudinal section through the head or casting and the turn-table.

The tower-mast A is of usual construction and is provided at its upper end with the bed-plate B, which has depending lugs, that are bolted to the sides of the posts composing the tower, and has the tubular extensions $b$ on its upper side, on which the turn-table or casting C is mounted, said casting being held on the tubular extension $b$ by the plate $b'$, which is secured to the end of the extension $b$. The cap B and plate $b'$ are centrally apertured to permit the passage of the pump-rod D and the regulating-rod E.

The casting C is provided with a bearing at one end for the wind-wheel shaft $f$ and at its other end with the tail-vane G, for steering it to wind, which is braced by the stay-rod $g$, connected at its lower end with the said tail-vane and at its upper end with the cross-bar H, which bar is mounted on the standards, $h$ and $h'$, projecting from the casting.

I represents the wind-wheel, which is mounted rigidly upon the horizontal shaft $f$, said wheel consisting of a central bored shaft receiving hub F, from which radiate arms or spokes $f^2$, connected at their ends by the rim $F^2$ and braced intermediate their ends by the ring $F'$.

J represents the slats, which are of the usual shape, and are of a length to extend from the inner ring $F'$ to and beyond the rim $F^2$. The slats J are each beaded at their opposite longitudinal edges, as at $k'$, and said edges near their upper ends are oppositely notched, the notch on one side of the blade receiving the rim $F^2$ and that of the other receiving a blade-operating semicircular section K. Pintles or pins $k$ are passed through the bead $k'$ at one side of the blade and serve to pivotally connect the blade with the section K, and similar pintles $j'$ are passed through the opposite bead and serve to pivotally connect the blade with the ring F' and rim $F^2$. The alternate terminals of each of the sections K are pivotally connected to one of the ends the oppositely-located bell-crank levers L, pivoted at their angle to the rim $F^2$, and to the opposite ends of said levers are pivotally connected by means of link $l$ depending levers M, pivoted near their center to the side face of an adjacent spoke or arm $f^2$. The inner ends of the levers M are connected with the sliding ring N on the casting C by the links $m$. The ring N is provided with pairs of lugs $n$, between which the ends of the links $m$ are pivoted. The yoke O, set astraddle of the bearing end of the casting C and having arms $o$, which embrace the sides of the casting and run in grooves $i$ in the sides of the said casting, is connected with the ring N by having formed thereon lateral projections $o'$ on the ends of the arms, which projections receive the ring N, as will be readily understood. The elbow shipper-lever P is pivoted to a bracket depending from the cross-bar H, and its lower end is connected with the yoke O, and its upper end, which is provided with the eye P', is connected to the upper end of the rod E, which extends down through the cap B or plate $b'$. The lower end of the rod E is connected with the weighted regulating-lever R, pivoted to the tower within convenient reach from the ground by the wires or chains $q\ q'$. The lower ends of the wires are connected with the lever R upon each side of its pivotal support, and their upper ends are connected with the end of the rod E. The wire $q$ passes up and over a pulley Q' on the tower at a higher level than the end of the rod E. Thus it will be seen that a pull on the wire $q$ will elevate the rod E, and, through the shipper-lever P, yoke O, ring N, links $m$ and $l$, levers M and L, and the rods K and K', will throw the slats in the wind, whereas a pull on the wire $q'$ will lower the rod E, and, through the devices just mentioned, throw the slats out of the wind. The lower edge of the lever R is notched, and the weight $r$, adapted to slide on the lever R, is held on the said lever in an adjusted position by the catch $r'$ engaging with the said notches, the catch being held in place by the spring $r^2$. The pitman-wheel S, keyed on the inner end of the wind-wheel shaft $f$, is connected with the pump-rod D by the pitman $d$. The pump-rod works through an opening in the cross-bar H. The brake T, carried by the shipper-lever P, is expanded at its lower end, which end is adapted to embrace and bear on the upper periphery of the pitman-wheel when the mill is out of gear and hold the wheel steady and prevent its having any possible motion. The levers M are so disposed and their connection with the slats or wings so proportioned that the slats will stand at an angle of about forty-five degrees to the wind when the mill is in full gear. This disposition of the parts has been found by practical demonstration to give the best results, and is therefore the most desirable. The levers M are sufficiently long to impinge against the outer rings and limit the movement of the slats or wings when in the wind. For light winds and for heavy work the slats are thrown full in the wind; but for light work in a heavy wind the slats are brought partially in the wind, the position of the slats being controlled by the weight $r$ on the lever R. Suppose the weight be set for a given work and a predetermined velocity of the wind and the force of the wind increases beyond that for which the mill is gaged. Obviously the force of the weight $r$ will be overcome and the slats will be thrown more or less out of the wind, proportionate to the power of the wind. When the force of the wind abates and the power of the weight predominates, the slats will be again thrown in the wind. When the engine is out of gear, the brake T will bear on the pitman-wheel and steady the wheel.

Having described my invention, I claim—

1. In a windmill, the wheel I, having the hub F, provided with the radial arms $f^2$ and stationary connecting-rims F' $F^2$, and the blades J, pivotally connected to the rims and at their outer edges to the independent semicircular movable curved sections K, in combination with the supporting-shaft $f$, the bell-crank levers L, pivoted to the rims $F^2$ and having their outer ends connected to the inner edges of the sections K, the pivotally-jointed levers M, connected with the ring N, the sliding yoke O, loosely engaging the ring, the turn-table C, for supporting the yoke and wheel, and the bell-crank lever P, loosely connected with the sliding yoke at one end and at the other with the rod E, the pivoted weighted lever R, and the ropes $q\ q'$, connected to the weighted lever at both sides of its pivot and intermediate its ends to the rod E, substantially as specified.

2. The combination, with the shaft $f$, having the crank-disk S located at its inner end, of the regulating-rod E, the bell-crank lever P, for feathering the blades, terminating in the eye P' and connected to the rod E, and the brake T, pivoted to the bell-crank lever, substantially as specified.

3. The combination, with the turn-table C, provided with opposite grooves or ways $i$, and the rotatable shaft $f$, intermediate the grooves, of the wheel I, mounted on one end of the shaft, and the disk S at the other, the ring N, encircling the table and connected to the wheel, the U-shaped yoke O, having opposite arms $o$ sliding in the grooves, and terminating in the ring-engaging lugs $o'$, the bell-crank lever P, loosely connected with the yoke at one end, and governing-rod connected to the opposite end of the lever, an arm for supporting the lever, and a brake-arm, as T, pivoted to the lever and bearing upon the crank-disk, substantially as specified.

4. In a windmill, the combination, with the crank-disk and the shipper-lever P, terminating at one end in a yoke, and with means for operating said lever, of the brake T, pivoted at its upper end within the yoke of said shipper-lever, and having its lower extremity concaved to correspond with and bearing upon the disk, substantially as specified.

In testimony that I claim the foregoing as my own I have hereto affixed my signature in presence of two witnesses.

WILLIAM H. RANDLE.

Witnesses:
W. M. McKINSTER,
CHARLES HATZE.